(12) United States Patent
Reed et al.

(10) Patent No.: US 9,415,373 B2
(45) Date of Patent: Aug. 16, 2016

(54) STRUCTURED CATALYTIC NANOPARTICLES AND METHOD OF PREPARATION

(75) Inventors: Kenneth J. Reed, Brighton, NY (US); Albert Gary DiFrancisco, Rochester, NY (US); Richard K. Hailstone, North Chili, NY (US); Gary R. Prok, Rush, NY (US); Thomas D. Allston, Lima, NY (US)

(73) Assignee: CERION, LLC, Rochester, NY (US)

(*) Notice: Subject to any disclaimer, the term of this patent is extended or adjusted under 35 U.S.C. 154(b) by 411 days.

(21) Appl. No.: 13/583,809

(22) PCT Filed: Mar. 8, 2011

(86) PCT No.: PCT/US2011/000429
§ 371 (c)(1),
(2), (4) Date: Nov. 26, 2012

(87) PCT Pub. No.: WO2011/112244
PCT Pub. Date: Sep. 15, 2011

(65) Prior Publication Data
US 2013/0109600 A1    May 2, 2013

Related U.S. Application Data

(60) Provisional application No. 61/311,416, filed on Mar. 8, 2010.

(51) Int. Cl.
*B01J 23/10* (2006.01)
*B01J 23/00* (2006.01)
(Continued)

(52) U.S. Cl.
CPC .............. *B01J 23/10* (2013.01); *B01J 23/002* (2013.01); *B01J 23/83* (2013.01); *B01J 37/0221* (2013.01);
(Continued)

(58) Field of Classification Search
CPC .......... B01J 23/10; B01J 23/002; B01J 23/83; B01J 37/31; B01J 37/35; C01G 49/00; C01G 49/009
See application file for complete search history.

(56) References Cited

U.S. PATENT DOCUMENTS

| 5,500,198 A | 3/1996 | Liu et al. |
| 6,051,529 A | 4/2000 | Brezny |

(Continued)

FOREIGN PATENT DOCUMENTS

| WO | WO 02/00812 A2 | 1/2002 |
| WO | WO2004/052998 A1 | 6/2004 |

OTHER PUBLICATIONS

*International Search Report (PCT/ISA/210) issued on May 5, 2011, by the U.S. Patent Office as the International Searching Authority for International Application No. PCT/US2011/000429.

(Continued)

*Primary Examiner* — Aileen B Felton
(74) *Attorney, Agent, or Firm* — RatnerPrestia

(57) ABSTRACT

A method of making a structured, doped, cerium oxide nanoparticle includes (a) forming a first reaction mixture including cerium(III), an optional metal ion other than cerium, a base, a stabilizer, and a solvent, (b) contacting the first reaction mixture with an oxidant, (c) forming a cerium oxide nanoparticle core by heating the product of step (b), (d) forming a second reaction mixture by combining with the first reaction mixture one or more metal ions other than cerium, and an optional additional quantity of cerium(III), and (e) forming a shell surrounding the core of cerium oxide by heating the second reaction mixture to produce a product dispersion of structured cerium oxide nanoparticles.

21 Claims, 3 Drawing Sheets

(51) Int. Cl.
- *B01J 23/83* (2006.01)
- *B01J 37/02* (2006.01)
- *B01J 37/03* (2006.01)
- *B82Y 30/00* (2011.01)
- *C01G 49/00* (2006.01)
- *C10L 1/12* (2006.01)
- *C10L 10/02* (2006.01)
- *C10M 125/10* (2006.01)
- *C01F 17/00* (2006.01)
- *B82Y 40/00* (2011.01)

(52) U.S. Cl.
CPC .............. *B01J 37/031* (2013.01); *B01J 37/035* (2013.01); *B82Y 30/00* (2013.01); *C01F 17/0018* (2013.01); *C01F 17/0043* (2013.01); *C01G 49/00* (2013.01); *C01G 49/009* (2013.01); *C10L 1/1233* (2013.01); *C10L 10/02* (2013.01); *C10M 125/10* (2013.01); *B82Y 40/00* (2013.01); *C01P 2002/52* (2013.01); *C01P 2004/03* (2013.01); *C01P 2004/04* (2013.01); *C01P 2004/45* (2013.01); *C01P 2004/64* (2013.01); *C01P 2004/84* (2013.01); *C10M 2201/062* (2013.01); *C10N 2220/082* (2013.01); *C10N 2250/12* (2013.01); *Y10S 977/775* (2013.01); *Y10S 977/811* (2013.01); *Y10S 977/89* (2013.01); *Y10S 977/902* (2013.01)

(56) References Cited

U.S. PATENT DOCUMENTS

| | | | |
|---|---|---|---|
| 6,136,048 A | 10/2000 | Birchem et al. | |
| 6,255,242 B1 | 7/2001 | Umemoto et al. | |
| 6,387,338 B1 | 5/2002 | Anatoly et al. | |
| 6,413,489 B1 | 7/2002 | Ying et al. | |
| 6,585,944 B1 | 7/2003 | Nunan et al. | |
| 6,752,979 B1 | 6/2004 | Talbot et al. | |
| 6,869,584 B2 | 3/2005 | Ying et al. | |
| 7,169,196 B2 * | 1/2007 | Wakefield | 44/354 |
| 7,384,888 B2 | 6/2008 | Kuno | |
| 2002/0177311 A1 * | 11/2002 | Schumacher et al. | 438/689 |
| 2003/0154646 A1 | 8/2003 | Hazarika et al. | |
| 2004/0009349 A1 | 1/2004 | Brotzman | |
| 2005/0152832 A1 | 7/2005 | Ying et al. | |
| 2005/0227864 A1 | 10/2005 | Sutorik et al. | |
| 2006/0083694 A1 | 4/2006 | Kodas et al. | |
| 2006/0120936 A1 | 6/2006 | Alive et al. | |
| 2006/0138087 A1 | 6/2006 | Simka et al. | |
| 2006/0210636 A1 | 9/2006 | Nonninger et al. | |
| 2007/0197373 A1 | 8/2007 | Miura et al. | |
| 2008/0009410 A1 | 1/2008 | Okamoto et al. | |
| 2008/0028673 A1 | 2/2008 | Hazarika et al. | |
| 2008/0161213 A1 | 7/2008 | Jao et al. | |
| 2011/0016775 A1 | 1/2011 | Hazarika et al. | |

OTHER PUBLICATIONS

*Written Opinion (PCT/ISA/237) issued on May 1, 2011, by the U.S. Patent Office as the International Searching Authority for International Application No. PCT/US2011/000429.

Patent Examination Report No. 1 for Corresponding Australian Application No. 2011224865, Issued June 19, 2014.

European Search Report mailed Sep. 30, 2015 in European Application No. 11753710.0.

Omata, T. et al., "Synthesis of $CeO_2$, $ZrO_2$ Nanocrystals, and Core-Shell-Type Nanocomposites,"Journal of the Electrochemical Society, vol. 153, No. 12, Jul. 10, 2006, pp. A2269-A2273.

* cited by examiner

STRUCTURED CATALYTIC NANOPARTICLES AND METHOD OF PREPARATION

CROSS-REFERENCE TO RELATED APPLICATIONS

This application claims the benefit of priority from U.S. Provisional Application No. 61/311,416, STRUCTURED CATALYTIC NANOPARTICLES AND METHOD OF PREPARATION, filed Mar. 8, 2010. This application is also related to: PCT/US07/077,545, METHOD OF PREPARING CERIUM DIOXIDE NANOPARTICLES, and PCT/US07/077,535, CERIUM DIOXIDE NANOPARTICLE-CONTAINING FUEL ADDITIVE, both filed Sep. 4, 2007; which applications claim the benefit of priority from: Provisional Application Ser. No. 60/824,514, CERIUM-CONTAINING FUEL ADDITIVE, filed Sep. 5, 2006; Provisional Application Ser. No. 60/911,159, REVERSE MICELLAR FUEL ADDITIVE COMPOSITION, filed Apr. 11, 2007; and Provisional Application Ser. No. 60/938,314, REVERSE MICELLAR FUEL ADDITIVE COMPOSITION, filed May 16, 2007. This application is also related to: US2010/0242342, CERIUM-CONTAINING NANOPARTICLES, filed May 13, 2010; and US2010/0152077, PROCESS FOR SOLVENT SHIFTING A NANOPARTICLE DISPERSION, filed Aug. 28, 2009; both applications of which claim the benefit of priority from PCT/US2008/087133, FUEL ADDITIVE CONTAINING LATTICE ENGINEERED CERIUM DIOXIDE NANOPARTICLES, filed Dec. 17, 2008. The disclosures of all of these applications are incorporated herein by reference.

FIELD OF THE INVENTION

The present invention relates in general to the preparation of structured nanoparticle compositions in which the atomic elements composing the particle interior or core are different from the atomic composition of the surface or shell. The invention further relates to nanoparticles containing cerium oxide and moreover to metal doped nanoparticles of cerium oxide. The invention is useful as a fuel borne combustion catalyst.

BACKGROUND OF THE INVENTION

Nanoparticulate cerium oxide (nanoceria) has many current applications as well as potential future applications. It is well known as an important component in solid oxide fuel cells, three-way automotive exhaust catalysts and automotive fuel borne catalysts. Its utility is often attributed to its redox chemistry, resulting from the facile $Ce^{3+}/Ce^{4+}$ electrochemical conversion. This allows nanoceria to store oxygen under oxidizing conditions (forming $Ce^{4+}$) and to release oxygen under reducing conditions (forming $Ce^{3+}$ and oxygen vacancies), a property commonly referred to as its oxygen storage capacity (OSC).

An end use application to which this invention particularly relates is the automotive fuel borne catalyst, a technology offering the potential, in the case of diesel engines, of fuel efficiency gains of about 34%. It is well recognized that a faster burn of fuel within the diesel combustion chamber will produce a higher pressure resulting in more energy capture as mechanical work and less energy waste as heat, thereby providing improved fuel economy. Moreover, reductions in harmful emission gases (e.g. $NO_x$, CO, $CO_2$, and soot) have also been observed when nanoceria is included as an additive in diesel fuel. These benefits are believed to result from the ability of nanoceria to store and release oxygen (OSC) in a diesel engine combustion chamber, thereby reducing local inhomogeneities in the fuel/oxygen mixture, enabling a faster and more complete burn.

Although substantially pure cerium oxide nanoparticles are of some benefit when included in applications such as fuel additives, it may be even more beneficial to use cerium oxide doped with components that may result, in part, in the formation of additional oxygen vacancies. Herein, the term "doped particle" refers to a particle containing one or more foreign or dopant ions. Doping of cerium oxide with metal ions to improve ionic transport, reaction efficiency and other properties is disclosed in, for example, U.S. Pat. Nos. 6,752,979; 6,413,489; 6,869,584; 7,169,196 B2; 7,384,888B2; and U.S. Patent Appl. Publ. No. 2005/0152832.

The homogeneous dispersal (doping) of two or more atomic species (metals) in ceria is disclosed by Talbot et al. in U.S. Pat. No. 6,752,979 using a surfactant micelle technique. Other literature includes, for example, Harrison et al. Chem. Mater. 2002, 14, 499-507 who describe Cu and Cr doping of ceria by a variety of methods followed by calcining; Liu in Chinese Journal of Chemical Physics 20, 6 (2007) who examine NiO and $Bi_2O_3$ doped $CeO_2$; US 20060120936A1 claims a three component system with Ce as the first component, Cu, Co, or Mn as the second component, and Sr as the third component. A process for predominately surface doping of cerium oxide nanoparticles is described by Wakefield in U.S. Pat. No. 7,169,196; wherein adsorption of dopant ions onto the surface of the nanoparticles is followed by firing (i.e. conventional high temperature ceramic processing), which will result in an uneven dopant distribution. Use of doped 10-20 nm diameter cerium oxide nanoparticles as a fuel additive is described, for which copper doping is particularly preferred.

Scientific focus around $CeO_2$ core and shell structures is brought to bear by Omata, et al. in the Journal of the Electrochemical Society 2006, 153(12) A2269-A2273, wherein $CeO_2/ZrO_2$ core-shell nanocrystals were synthesized by the addition of undoped $CeO_2$ nanocrystals as seed crystals in the $ZrO_2$ source solution, followed by reaction at 300° C. A core-shell nanostructure is proposed, consisting of an undoped 2.4 nanometer (nm) diameter $CeO_2$ core with a 1.2 nm thick $ZrO_2$ shell, and is supported by XRD, high-resolution TEM and XPS results. This proposed core constitutes about 12.5% of the nanoparticle by volume, while the shell constitutes about 87.5% of the nanoparticle by volume. In other work, Singh, P. and Hegde, M. S. employ a hydrothermal method using diethylenetriamine and melamine as complexing agents, describing that the cubic fluorite lattice of ceria is still evident by EXD at up to 50% substitution of Zr for Ce, in Journal of Solid State Chemistry 181 (2008) 3248-3256. Lambrou, P and Efstatiou, A. in Journal of Catalysis, 240 (2006) 182-193 report an increase in OSC for doped ceria in going from 0.1 to 0.3% iron content, but then a loss in OSC at 0.4% relative to the lower iron levels.

Zirconium doping has received much attention due to its ability to inhibit the sintering of $CeO_2$ at high temperature, as disclosed, for example, in U.S. Pat. Nos. 6,051,529 and 6,255, 242 B1 Umemoto et al. (2001); U.S. Pat. No. 6,387,338 B1 Anatoly, et al. (2002); U.S. Pat. No. 6,585,944 B1 Nunan et al. (2003); and US 20070197373 Miura, M. et al. (2005). Kuno, O. in U.S. Pat. No. 7,384,888B2 discloses an undoped $CeO_2$ core surrounded by a $ZrO_2$ shell made by addition of Zr to a preformed ceria sol, followed by calcination at 700° C. Additional structured core and shell art is provided by WO 2004/052998A1, US 2006/0138087, DE 2001-101311173A3, DE 2001-10164768, U.S. Pat. Nos. 6,136,048A1, 5,500,198 and WO0200812A2. However, none of these patents or patent applications teach how to obtain particle sizes of less than about 5 nm, or less than 3 nm for the doped particles.

Several workers have suggested that a homogeneous dopant spatial distribution is preferred. Mamontov et al. J Phys. Chem. B 2003, 107 13007-13-14 concluded on the basis of pulsed neutron diffraction studies that in $Ce_{0.5}Zr_{0.5}O_2$ a more homogeneous distribution of Zr was responsible for the enhanced OSC and that OSC did not correlate with particle or crystallite size. Nagai et al. in Catalysis Today, 74, (2002) 225-234 arrived at the same conclusion as Mamontov using EXAFS techniques. On the topic of particle size distribution, Rohart, E. et al. in Topics in Catalysis Vols. 30/31, 417-423 (2004) conclude that a fractal (heterogeneous size distribution) texture is preferred for thermal stability after examining a range of Zr and Ce compositions.

Commonly assigned PCT/US07/077,545, METHOD OF PREPARING CERIUM DIOXIDE NANOPARTICLES, filed Sep. 4, 2007, describes stabilized cerium oxide nanoparticles comprising a core and a shell, wherein the shell comprises a material selected from the group consisting of a transition metal, a lanthanide, a sulfur-containing compound that may include a mercaptide group, and combinations thereof. Preferably, the core comprises about 90% or less of the nanoparticle by volume, and the shell comprises about 5% or more of the nanoparticle by volume. The disclosure states that the core of the particle preferably includes at least about 75%, more preferably, about 95% or greater of the bulk particle, and may be optionally doped with a metal. The shell, including the outer portion and surface of the particle, preferably comprises about 25% or less, more preferably about 10% or less, most preferably about 5% or less, of the particle, and includes a transition or lanthanide metal.

In summary, it is clear that significant opportunities for improvement of nanoceria based fuel additives remain. To date, relative to the theoretical potential gain of about 34%, only modest diesel fuel efficiency gains of 5-10% have been reported in laboratory tests of nanoceria additives, while commercial on-road diesel bus fuel efficiency gains of only about 4-5% have been realized. In addition, lengthy diesel engine conditioning periods on the order of 8 weeks have been required before the fuel efficiency benefits of nanoceria fuel additives have been observed. Lastly, nanoceria fuel additives have failed to show benefits in gasoline engines, wherein it is believed that oxygen is not released quickly enough from the nanoceria particles to be effective at the higher rpm's (shorter combustion times) at which these engines typically operate. Thus there remains a need to further increase the amount of oxygen stored/released, as well as the rate at which oxygen is stored/released by nanoceria particles when used as a fuel borne catalyst. Means to simultaneously and independently control of both the thermodynamic (OSC) and kinetic (Rate Constant) properties of nanoparticle combustion catalysts, not heretofore achieved, would be greatly beneficial.

SUMMARY OF THE INVENTION

The particles and methods disclosed herein advance the art of nanoparticle combustion catalysis by improving both the thermodynamic (OSC) and kinetic (Rate) properties. in one embodiment, there is provided a method for forming a structured doped cerium oxide nanoparticle comprising the steps of: (a) forming a first reaction mixture comprising a source of cerium(III) ion, optionally a source of one or more metal ions other than cerium, a base, a stabilizer and water; (b) introducing an oxidant capable of oxidizing cerium(III) ion to cerium (IV) ion; (c) providing temperature conditions effective to form a core region of a doped cerium oxide nanoparticle; (d) forming a second reaction mixture subsequent to the first reaction by introducing a source of one or more metal ions other than cerium, and, optionally, a source of cerium (III) ions into the reaction product of the first reaction mixture with sufficient oxidant to oxidize cerium (III) ion to cerium (IV) ion; (e) providing temperature conditions effective to form a shell region of a doped cerium oxide nanoparticle, wherein the ratio of metal ions comprising the first reaction mixture differs from the ratio of metal ions introduced in forming the second reaction mixture, thereby producing a structured doped cerium oxide nanoparticle; (f) heating the first and second reaction mixtures to form the doped cerium oxide nanoparticles; and (g) cooling the product dispersion of structured doped cerium oxide nanoparticles.

In another embodiment, the method involves making a structured, doped, cerium oxide nanoparticle, comprising the steps of: a) forming a first reaction mixture comprising cerium(III), an optional metal ion other than cerium, a base, a stabilizer, and a solvent; b) contacting said first reaction mixture with an oxidant; c) forming a cerium oxide nanoparticle core by heating the product of step b); c) forming a second reaction mixture by combining with the first reaction mixture one or more metal ions other than cerium, and an optional additional quantity of cerium(III); and d) forming a shell surrounding said core of cerium oxide by heating said second reaction mixture to produce a product dispersion of structured cerium oxide nanoparticles.

Cooling the product dispersion of these methods provides core-shell structured, nanoparticulate, doped, cerium oxide. The nanoparticles are substantially free of agglomeration, and are single crystallites; and can be fabricated of uniform size-frequency distribution. Uniform size frequency distribution can mean a distribution wherein the coefficient of variation, COV, (the mean divided by one standard variation, ie one sigma) is 25% or less. Thus a 2.5+/−0.5 nm particle population would have a COV of 20%.

As used herein, the reference to cerium (III) contemplates cerium in that oxidation state, and regardless whether it is in molecular form, salt form or other form.

Among other things, we demonstrate herein that the particle size at which a ceria nanoparticle (nominal formula $CeO_2$) exhibits surprisingly high reactivity (e.g., as by Rate Constant), is ~2.5 nm. At this size, a nanoparticle (octahedral) may contain ~80 cerium atoms and ~160 oxygen atoms; and eighty of those oxygen atoms may reside on the surface; of which seventy-two may occupy corner or edge positions, and thus can be quite labile (reactive). Once reacted (released) they can give $Ce_{80}O_{120}$, more conventionally written as $Ce_2O_3$, the chemically reduced form of the catalyst. Smaller nanoparticles (e.g. 1.1 nm), may be too lattice-strained to react or possess a preponderance of the reduced form of cerium ions ($Ce^{3+}$) on the surface; while larger nanoparticles may have many interior oxygen atoms that must diffuse larger distances to reach the surface before reacting and thus require higher temperatures and longer times to react.

Also disclosed herein is that core-shell structures permit independent control of the particle thermodynamics (amount of oxygen release) and the particle kinetics (rate at which the oxygen atoms are released and are active). These structures can be represented as $[Ce_{(1-x)}(M_c)_xO_{2-\delta}]_c[Ce_{(1-y)}(M_s)_yO_{2-\delta}]_s$, where $M_c$ represents one or more metals located in the core, c, of the nanoparticle; $M_s$ represents one or more metals located in the shell, s, of the nanoparticle; wherein c+s=1 and c or s may range from 0.25 to 0.75; x can vary from 0.01 to 0.95; y can vary from 0.01 to 1.0; and δ varies from about 0.0 to about 0.5.

Alternatively stated, structured, doped, cerium oxide nanoparticles comprise: a core-shell structure $[Ce_{(1-x)}(M_c)_xO_{2-\delta}]_c$ $[Ce_{(1-y)}(M_s)_yO_{2-\delta}]_s$; wherein $[Ce_{(1-x)}(M_c)_xO_{2-\delta}]_c$ is the structure of the core; and $M_c$ is a metal other than cerium; $[Ce_{(1-y)}(M_s)_yO_{2-\delta}]_s$ is the structure of the shell; and $M_s$ is a metal other than cerium; and wherein c+s=1, and c and s are about 0.25 to about 0.75; x is about 0.01 to about 0.95; y is about 0.01 to 1.0; and δ is 0.0 to about 0.5.

In some embodiments the values of c and s are between 0.6 and 0.4; and in other embodiments, they are the same.

In some embodiments, $M_c$ and $M_s$ are the same or different, and are selected from the group consisting of: Li, Mg, Sc, Ti, V, Cr, Zr, Mn, Fe, Co, Ni, Cu, Ag, Au, Bi, Pd, Pt, Pr, Gd, and Sm Y, La, and combinations thereof; and in some embodiments they are selected from transition metals; and in still other embodiments, they are iron and/or zirconium.

The cerium oxide nanoparticle may be that wherein $M_s$ consists essentially of iron, and y is 1.0; or wherein $M_c$ and $M_s$ are iron and y is greater than x; or wherein $M_c$ and $M_s$ are zirconium and y is greater or less than x.

The cerium oxide nanoparticles may be configured to have a geometrical diameter from about 1 to about 6 nanometers; or from about 2 to 4 nanometers.

By a judicious choice of (1) nanoparticle size, (2) core/shell size ratio, (3) core metal ion composition and (4) surface metal ion composition, it is possible to simultaneously control and independently optimize both the thermodynamic (equilibrium, e.g. OSC) and kinetic (non-equilibrium, e.g. rate) catalytic properties of these structured doped cerium oxide nanoparticle compositions.

It is a further object of the present invention to produce a fuel-borne additive—a nanoparticle combustion catalyst, which is effective in improving fuel economy, reducing the level of unwanted exhaust by-products, such as $NO_x$, CO, $CO_2$, and soot, while avoiding need for lengthy engine conditioning period.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 3B is a high resolution Field Emission Gun TEM image of 2.5 nm $CeO_2$ particles.

DETAILED DESCRIPTION

Figure 1A:
FIGS. 1A and 1B are, respectively, a high resolution Transmission Electron Micrograph (TEM) image of 1.1 nm pure ceria particles and their respective electron diffraction pattern confirming the cubic lattice fluorite structure associated with $CeO_2$ (prepared as described in the EXPERIMENTAL SECTION).

Elements not specifically shown or described herein may take various forms known to those skilled in the art. The invention is defined by the claims.

Ad used herein, the term "metal" in referring to elements of the Periodic Table includes all elements other than those of the following atomic numbers: 1-2, 5-10, 14-18, 33-36, 52-54, 85 and 86.

The term "transition metal" in referring to elements of the Periodic Table includes the 30 chemical elements of atomic number 21 to 30, 39 to 48, 57 and 72 to 80, which are included in Periods 4, 5, 6, respectively, of the Periodic Table.

While a metal dopant may be selected from the broader group of alkali metals, alkaline earth metals, transition metals and rare earth metals including, for example, but not limited to, Li, Mg, Sc, Ti, V, Cr, Zr, Mn, Fe, W, Co, Ni, Cu, Ag, Au, Bi, Pd, Pt, Pr, Gd, Sm, Y, La, and combinations thereof are also contemplated. In one embodiment, the transition metal dopant is iron. In other embodiments, the transition metals are Zr, La or Y, alone or in combination with Fe.

As used herein, "nanoparticles" are particles having a mean diameter of less than about 100 nm. The size of the resulting cerium-containing oxide nanoparticles may be determined by dynamic light scattering, a measurement technique for determining the hydrodynamic diameter of the particles. The hydrodynamic diameter is typically slightly larger than the geometric diameter of the particle because it includes both the native geometric particle size and the solvation shell surrounding the particle. Alternatively, the geometric diameter of a nanoparticle may be determined by analysis of transmission electron microscopy (TEM) images. In one particular embodiment, the structured doped cerium oxide nanoparticles have a median or mean geometric diameter ranging from 1.5 to 6 nm. In another embodiment, the median or mean geometric diameter ranges from 2 to 4 nm. In still another embodiment, the median or mean geometric diameter ranges from 2 to 3 nm.

Although nominally described as "cerium oxide" or "cerium dioxide", it is understood by those skilled in the chemical arts, that the actual oxidic anions present may comprise oxide anions or hydroxide anions, or mixtures thereof, such as hydrated oxide phases (e.g. oxyhydroxide). In addition, compositions of matter comprising solid solutions of multivalent cations are often termed non-stoichiometric solids. Thus, for oxide phases comprised of metal cations of multiple oxidation states, it is understood that the total amount of oxidic anions present will be determined by the specific amounts of the various oxidation states of the metal cations present (e.g. $Ce^{3+}$ and $Ce^{4+}$), such that charge neutrality is maintained. For non-stoichiometric phases nominally described as metal dioxides, this is embodied in the chemical formula $MO_{2-\delta}$, wherein the value of δ (delta) may vary. For cerium oxides, $CeO_{2-\delta}$, the value of δ (delta) typically ranges from about 0.0 to about 0.5, the former denoting cerium (IV) oxide, $CeO_2$, the latter denoting cerium (III) oxide, $CeO_{1.5}$ (alternatively denoted $Ce_2O_3$).

The term "doped" particle refers to a particle containing one or more foreign or dopant ions present in concentrations greater than would be expected to be present as impurities. Thus, dopants contemplate deliberately added elements or components at discernable concentration, and above those of impurities or background. Generally, and as used herein, a dopant is present in concentrations ranging from about 0.1 percent to about 99.9 percent, and may be of either a substitutional or non-substitutional nature. Above 50% doping, the roles of host and guest ions become transposed.

Doping of cerium dioxide with a metal ion may be described in general by the formula $Ce_{1-x}M_xO_{2-\delta}$, wherein x varies from about 0.001 to about 0.999, and δ varies from about 0.0 to about 0.5 in order to maintain charge neutrality. It is understood that the value of δ may be less than zero for metal dopant ions with a formal valence state greater than 4+. Some alternative terms commonly used in place of "doped" are "substituted", "mixed metal" and "lattice engineered."

The term "structured, doped, cerium oxide" nanoparticle refers to a nanoparticle comprising both a core region comprising cerium, and a shell region optionally comprising cerium, wherein the composition of metals in the core region differs from the composition of metals in the shell region. In this way, the core and shell regions of a structured doped nanoparticle are distinguished by the type or amount of metal dopant introduced relative to the amount of cerium. Some alternative terms commonly used in place of "structured doped" are "inhomogeneously doped", "discontinuously doped", "unevenly doped" and "non-uniformly doped."

In a process of preparing structured doped cerium oxide nanoparticles, formation of the core region precedes formation of the shell region. In one embodiment, the structured doped cerium oxide nanoparticle comprises an interior region comprised of material introduced during core formation, surrounded by a continuous exterior surface region comprised of material introduced during shell formation. In one embodiment, the respective compositions of the core and shell are substantially uniform in the distribution of the various components (e.g., cerium and dopant); and in other embodiments, the structure is deliberately manipulated such that dopants are positioned to advantage, e.g., on corners or in the face of the crystallite structure.

Unless stated otherwise, the term structured doped cerium oxide contemplates a core-shell structure wherein the shell continuously covers the exterior of the core.

In another embodiment, the structured doped cerium oxide nanoparticle comprises an interior (core) region that is only partially surrounded by the surface (shell) region, such that some of the surface of the resulting composite particle is comprised of material introduced during core formation. In other embodiments, the structured doped cerium oxide nanoparticle comprises particles composed entirely of material introduced during formation of the core region, or entirely of material introduced during formation of the shell region. In other embodiments, the structured doped cerium oxide nanoparticle is characterized by three or more distinct compositional phases.

In various embodiments, structured doped cerium oxide nanoparticles have the structural formula:

$$[Ce_{(1-x)}(M_c)_xO_{2-\delta}]_c[Ce_{(1-y)}(M_s)_yO_{2-\delta}]_s$$

where $M_c$ represents one or more metals located in the core, c, of the nanoparticle; $M_s$ represents one or more metals located in the shell, s, of the nanoparticle; wherein c+s=1; and c or s are from 0.25 to 0.75, x is from about 0.01 to about 0.95; and y is from 0.01 to 1.0, and $\delta$ is from about 0.0 to about 0.5. In another embodiment, c and s are substantially equal (0.5), whereby it is meant that c or s may be from 0.45 to 0.55, given the limitation that the sum of c and s must equal one.

In one embodiment, there is a method of producing structured doped cerium oxide nanoparticles of the core-shell type comprising the steps of (a) forming a first reaction mixture comprising a source of cerium(III) ion, optionally a source of one or more metal ions other than cerium, a base, a stabilizer and water; (b) introducing an oxidant capable of oxidizing cerium(III) ion to cerium(IV) ion; (c) providing temperature conditions effective to form a core region of a doped cerium oxide nanoparticle; (d) forming a second reaction mixture subsequent to the first reaction by introducing a source of one or more metal ions other than cerium, and, optionally, a source of cerium (III) ions into the reaction product of the first reaction mixture with sufficient oxidant to oxidize cerium (III) ion to cerium (IV) ion; (e) providing temperature conditions effective to form a shell region of a doped cerium oxide nanoparticle, wherein the ratio of metal ions comprising the first reaction mixture differs from the ratio of metal ions introduced in forming the second reaction mixture, thereby producing a structured doped cerium oxide nanoparticle; (f) heating the first and second reaction mixtures to form the doped cerium oxide nanoparticles; and (g) cooling the product dispersion of structured doped cerium oxide nanoparticles, and, optionally, (d) removing unreacted materials and reaction by-products, and, optionally, (e) concentrating the resulting dispersion.

While not wishing to be held to any particular theory, in the presence of an oxidant, cerous ion reacts to form ceric ion, which upon further heating in the reaction mixture may be converted to a crystalline cerium-containing oxide. In various embodiments the temperature of the reaction mixture is ramped to, or maintained between, about 60° C. and about 95° C. In general, time and temperature can be traded off, higher temperatures typically reducing the time required for formation of the product oxide. After a period of time at these elevated temperatures, the cerous and/or other metal ion may be converted to crystalline cerium oxide, crystalline metal oxide or a crystalline cerium-containing mixed metal oxide phase.

As used herein, a material is crystalline if it produces a diffraction pattern upon irradiation by a beam of either electrons or X-rays; otherwise it is deemed amorphous. In some embodiments, the structured doped cerium oxide nanoparticles exhibit the cubic fluorite crystal structure. The term single crystallite particle refers to particles that are not composed of multiple, agglomerated crystallites of various sizes, but rather a single crystal of well-defined dimensions dictated by the number of constituent unit cells. In some embodiments, the single crystallite particles contain about two unit cells per edge for 1.1 nm particles, or up to about 5 unit cells per edge for 2.7 nm particles.

Crystalline cerium oxide nanoparticles can be prepared by a variety of procedures. Synthetic routes using water as a solvent yield an aqueous mixture of nanoparticles and one or more salts. For example, cerium (IV) oxide particles can be prepared by reacting the hydrate of cerium (III) nitrate with hydroxide ion from, for example, aqueous ammonium hydroxide, and thereby forming cerium (III) hydroxide, as shown in equation (1a). Cerium (III) hydroxide can be oxidized to cerium (IV) oxide ($CeO_2$) with an oxidant such as hydrogen peroxide, as shown in equation (1b). The analogous tris hydroxide stoichiometry is shown in equations (2a) and (2b).

$$Ce(NO_3)_3(6H_2O) + 2NH_4OH \rightarrow Ce(OH)_2NO_3 + 2NH_4NO_3 + 6H_2O \quad (1a)$$

$$2Ce(OH)_2NO_3 + H_2O_2 \rightarrow 2CeO_2 + 2HNO_3 + 2H_2O \quad (1b)$$

$$Ce(NO_3)_3(6H_2O) + 3NH_4OH \rightarrow Ce(OH)_3 + 3NH_4NO_3 + 6H_2O \quad (2a)$$

$$2Ce(OH)_3 + H_2O_2 \rightarrow 2CeO_2 + 4H_2O \quad (2b)$$

Complexes formed with very high base levels, e.g. 5 to 1 ratio of OH to Ce, also provide a route to cerium (IV) oxide, albeit at much larger grain sizes if not properly growth-restrained.

In some cases, especially those in which ammonium hydroxide is not present in excess relative to the cerous ion, the species $Ce(OH)_2(NO_3)$ or $(NH_4)_2Ce(NO_3)_5$ may initially be present, subsequently undergoing oxidation to cerium (N) oxide.

Commonly assigned PCT/US2007/077545, METHOD OF PREPARING CERIUM DIOXIDE NANOPARTICLES, filed Sep. 4, 2007, describes a mixing device that is capable of producing CeO$_2$ nanoparticles down to 1.5 nm, in high yield and in very high suspension densities. The reactor includes inlet ports for adding reactants, an impeller, a shaft, and a motor for mixing. The reaction mixture is contained in a reactor vessel. Addition to the vessel of reactants such as cerium nitrate, an oxidant, and hydroxide ion can result in the formation of CeO$_2$ nanoparticles, which are initially formed as very small nuclei. Mixing causes the nuclei to circulate; as the nuclei continuously circulate through the reactive mixing regime, they grow (increase in diameter) as they incorporate fresh reactants. Thus, after an initial steady state concentration of nuclei is formed, this nuclei population is subsequently grown into larger particles in a continuous manner. Unless grain growth restrainers are employed to terminate the growth phase, this nucleation and growth process is not desirable if one wishes to limit the final size of the particles while still maintaining a high particle suspension density.

Regardless whether the synthesized nanoparticles are made in a hydrophilic or hydrophobic medium, however, the ceria nanoparticles benefit from a stabilizer to prevent undesirable agglomeration.

In a particular embodiment, the nanoparticle stabilizer is water-soluble and forms weak bonds with the cerium ion. $K_{BC}$ represents the binding constant of the nanoparticle stabilizer to cerium ion in water. Log $K_{BC}$ for the nitrate ion is 1 and for hydroxide ion is 14. In various embodiments, log $K_{BC}$ lies within this range; and in specific embodiments it lies in the middle of this range.

Useful nanoparticle stabilizers include alkoxysubstituted carboxylic acids, α-hydroxyl carboxylic acids, α-keto carboxylic acids such as pyruvic acid, and small organic polyacids such as tartaric acid and citric acid. Examples of alkoxylated carboxylic acids are: methoxyacetic acid (MAA), 2-(methoxy)ethoxy acetic acid and 2-[2-(2-methoxyethoxy)ethoxy]acetic acid (MEEA). Among the α-hydroxycarboxylic acids, examples are lactic acid, gluconic acid and 2-hydroxybutanoic acid. Polyacids include ethylenediaminetetraacetic acid (EDTA), tartaric acid, and citric acid. Combinations of large $K_{BC}$ stabilizers such as EDTA or gluconic acid with weak $K_{BC}$ stabilizers such as lactic acid or citric acid are useful at various ratios.

In another embodiment, the ceria nanoparticle stabilizer includes a compound of formula (3), wherein R represents hydrogen, or a substituted or unsubstituted alkyl group or aromatic group such as, for example, a methyl group, an ethyl group or a phenyl group.

$$RO(CH_2CH_2O)_n CHR^1 CO_2Y \quad (3)$$

R may represent a lower alkyl group (C$_{1-6}$), and, in particular, may be a methyl group. R$^1$ represents hydrogen or a substituent group such as an alkyl group (e.g., lower alkyl). In formula (3), n represents an integer of 0-5, and Y represents H or a counterion such as an alkali metal, for example, Na$^+$ or K$^+$. The stabilizer binds to the nanoparticles and prevents agglomeration of the particles and the subsequent formation of large clumps of particles.

In another embodiment, the ceria nanoparticle stabilizer is a dicarboxylic acid, including "gemini carboxylates", where the carboxylic groups are separated by at most two methylene groups; and derivatives thereof, such as those represented by formula (4), wherein each R$^2$ independently represents a substituted or unsubstituted alkyl, alkoxy or polyalkoxy group, or a substituted or unsubstituted aromatic group. X and Z independently represent H or a counterion such as Na$^+$ or K$^+$, and p is 1 or 2.

$$XO_2C(CR^2)_p CO_2Z \quad (4)$$

Useful nanoparticle stabilizers are also found among α-hydroxysubstituted carboxylic acids such as lactic acid and among the polyhydroxysubstituted acids such as gluconic acid.

As mentioned above, when an aqueous preparation is employed, the cerium-containing oxide nanoparticle dispersion may be purified, e.g., wherein the unreacted cerium salts (e.g. nitrate) and waste by-products (e.g. ammonium nitrate) are removed, for example, by diafiltration. In order to promote subsequent solvent shifting into less polar media, including non-polar media, one may reduce the ionic strength to a conductivity of about 5-10 mS/cm or less. The product dispersion may be diluted or concentrated before, during, or after the purification process. In various embodiments, the concentration of the product structured doped cerium oxide nanoparticle dispersion is greater than about 0.5 molal, greater than about 1.0 molal, or greater than about 2.0 molal (approximately 35% solids in the dispersion).

In another embodiment, a process is provided for forming a homogeneous dispersion containing the structured doped cerium oxide nanoparticles, at least one nanoparticle stabilizer, a diluent less polar than water, at least one surfactant, and a non-polar medium. Various processes to achieve this end are disclosed in commonly assigned U.S. patent application Ser. No. 12/549,776, PROCESS FOR SOLVENT SHIFTING A NANOPARTICLE DISPERSION, filed Aug. 28, 2009. In particular embodiments, the diluent that is less polar than water is one or more glycol ethers. The diluent may further include an alcohol, alone or in combination with others. In one embodiment, the diluent is diethylene glycol monomethyl ether or 1-methoxy-2-propanol, or a mixture thereof.

In various embodiments, the non-polar medium (hydrocarbon diluent) is selected from among hydrocarbons containing about 5-22 carbon atoms, for example, octane, decane, kerosene, toluene, naphtha, diesel fuel, biodiesel, isoparaffin distillates (e.g. ISOPAR™), hydrotreated petroleum distillates (e.g. KENSOL® 48H, KENSOL® 50H), and mixtures thereof, to form a homogeneous dispersion. The homogeneous dispersion may further include a surfactant, such as a fatty acid (e.g. octanoic acid, oleic acid, isostearic acid).

In some embodiments, the homogeneous dispersion contains a minimal amount of water, e.g., less than about 0.5 wt. %; less than about 0.05 wt. %; less than about 0.005 wt. %; less than about 0.0005 wt. %; or less than about 0.00005 wt. %. When used as a fuel additive, one part of the homogeneous dispersion is combined with at least about 100 parts of the fuel.

As is known to those skilled in the chemical arts, cerium oxide is widely used as a catalyst in automotive catalytic converters for the elimination of toxic exhaust emission gases and in diesel particulate filters for the reduction of particulate emissions in diesel powered vehicles. Within the catalytic converter or diesel particulate filter, the cerium oxide can act as a chemically active component, acting to release oxygen in the presence of reductive gases, as well as to remove oxygen by interaction with oxidizing species. The structured doped cerium oxide nanoparticles of the present invention and the process for making thereof, can be used to form a catalyst for this purpose.

Motor oil is used as a lubricant in various kinds of internal combustion engines in automobiles and other vehicles, boats, lawn mowers, trains, airplanes, etc. Engines contain contacting parts that move against each other at high speeds, often for prolonged periods of time. Those moving parts create friction, which can form a temporary weld, immobilizing the moving parts. Breaking this temporary weld absorbs otherwise useful power produced by the motor and converts the energy to useless heat. Friction also wears away the contacting surfaces of those parts, which may lead to increased fuel consumption and lower efficiency and degradation of the motor. In one embodiment of the invention, a motor oil includes a lubricating oil and structured doped cerium oxide nanoparticles, having a mean diameter of 1.5-6 nm, or a mean diameter of 2-4 nm, or alternatively, a mean diameter of 2-3 nm, and optionally a surface adsorbed stabilizing agent that is delivered as a homogeneous dispersion in a non-polar medium. Such formulations have improved lubrication properties.

Diesel lubricating oil and fuels are essentially free of water (preferably less than 300 ppm) but may be modified by the addition of a structured doped cerium oxide nanoparticle composition, wherein the structured doped cerium oxide nanoparticles have been solvent shifted from their aqueous reaction environment to that of an organic or non-polar medium. The structured doped cerium oxide compositions include nanoparticles having a mean diameter of less than about 6 nm, or less than about 4 nm, or less than about 3 nm, as already described. A diesel engine operated with modified diesel fuel and/or modified lubricating oil provides greater efficiency and may, in particular, provide improved fuel mileage, reduced engine wear or reduced pollution, or a combination of these features.

Metal polishing, also termed buffing, is the process of smoothing metals and alloys and polishing to a bright, smooth mirror-like finish. Metal polishing is often used to enhance cars, motorbikes, antiques, etc. Many medical instruments are also polished to prevent contamination in irregularities in the metal surface. Polishing agents are also used to polish optical elements such as lenses and mirrors to a surface smoothness within a fraction of the wavelength of the light they are to manage. Polishing agents may be used for planarization (rendering the surface smooth at the atomic level) of semiconductor substrates for subsequent processing of integrated circuits. Homogeneous dispersions of uniformly dimensioned structured doped cerium oxide particles in aqueous media of varying acidity/alkalinity, in media of reduced polarity relative to water, or in non-polar media, may be advantageously employed as polishing agents in polishing operations.

The invention is further illustrated by the following examples, which are not intended to limit the invention in any manner.

EXPERIMENTAL SECTION

Preparation of ~1, 2, and 11.8 nm $CeO_2$ Nanoparticles:

Aqueous solutions of organic stabilizer and $Ce(NO_3)_3 \cdot 6H_2O$ were added to a water-jacketed reaction vessel. Next, a 50% $H_2O_2$ solution was added and the vessel was mixed with a high-speed shearing mixer at 8100 rpm. Aqueous 28-30% $NH_4OH$ was added under high-speed mixing, after which a prop stirrer was used at 500 rpm. The reactor temperature was raised to 70° C. over 30 min, and then held at 70 C for 50-90 min, depending on the particular formulation. The reaction vessel was cooled to room temperature over 30 min and then diafiltered with a Millipore 3 Kdalton ultrafiltration membrane to an ionic conductivity of 3 mS/cm² or less.

Figure 1B:
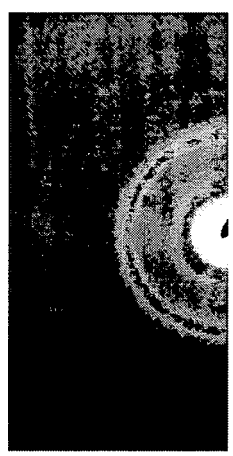
Figure 2A:
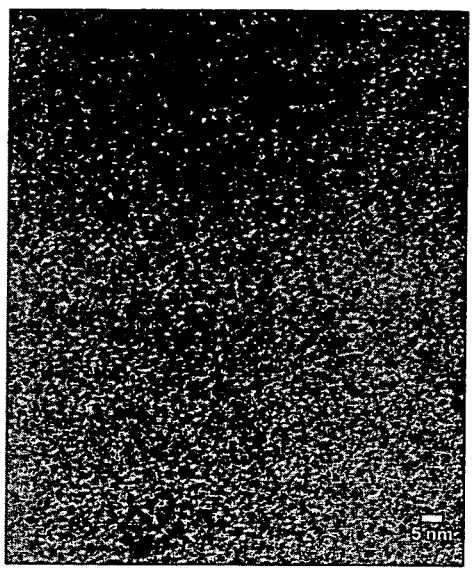
FIGS. 2A and 2B are, respectively, a high resolution TEM image of 2.0 nm pure ceria particles and their respective electron diffraction pattern which confirms the cubic lattice fluorite structure associated with $CeO_2$ (prepared as described in the EXPERIMENTAL SECTION).
Figure 2B:

While not wishing to be bound by any particular theory, particle formation appears to proceed through a $Ce(OH)_3$ intermediate phase, followed by oxidation to $CeO_2$ by $H_2O_2$, probably in the form of OH radicals. For 1.1 nm particles (FIG. 1 TEM and ED) a stabilizer combination of ethylenediaminetetraacetic acid and lactic acid was used, whereas 2 nm particles (FIG. 2 TEM and ED) were stabilized by methoxyethoxyethoxyacetic acid. The largest particles studied (11.8 nm) were prepared by methods disclosed by Chen and Chang (H. Chen H.; Chang, H. Ceramics Intl. 2005, 31, 795-802) and Zhang et al. (Zhang, F.; Jin, Q.; Chan, S.-W. J. Appl. Phys. 2004, 95, 4319-4326). In this case no stabilizer was used and the particles were not diafiltered. In this manner a size series of $CeO_2$ nanoparticles was prepared.

Particle Sizing by Transmission Electron Microscopy:

Specimens for TEM examination were prepared from the (diafiltered) aqueous suspensions of the above described size series of $CeO_2$ nanoparticles by a suitable dilution in 0.02 M solution of an organic stabilizer. A 10 microliter drop was placed on a carbon-film-covered copper grid and allowed to air dry. Images and selected-area diffraction patterns were obtained in either a JEOL 2000FX or 100CX TEM, both with tungsten filaments. Image magnification was calibrated using phase-contrast images of asbestos fibers. High resolution (HRTEM) images were obtained on a JEOL 2010F TEM. Images were recorded on Kodak 4489 electron microscope film and digitized with a Nikon 9000 film scanner.

Particle sizing was done using Image J (Imaging Processing and Analysis in Java) image processing software. First, the images were histogram equalized to improve their contrast. Then, they were threshold adjusted to give a binary image with the same particle size as in the original image. Next, areas were determined for 100 to 200 particles and from these the number-averaged diameter was calculated, assuming spherical morphology. For electron diffraction the camera length was calibrated using a TlCl microcrystal standard. The radii of diffraction rings were determined using the radial profile plug-in in Image J.

Particle Size Measurement: Hydrodynamic Diameter

Characterization of the particle size of an aqueous dispersion was provided using a Brookhaven 90Plus Particle Size Analyzer (Brookhaven Instruments Corp., Holtzville, N.Y., U.S.A.), which determines the hydrodynamic diameter of the particles by dynamic light scattering (DLS) techniques. Reported sizes are the lognormal number weighted parameter unless specifically stated otherwise.

Nanoparticle Scattering Assessment:

A simple qualitative characterization of the nanoparticle dispersions was developed based on the visual assessment of the scattering power of the visually clear dispersions when illuminated by a red laser pen light.

Measurement of OSC and Rate Constant:

The chemical reactivity of a ceria based three-way or fuel borne catalyst can conveniently be measured by following the progress of the reaction

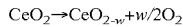

The extent to which the reaction gives off oxygen (the number of moles of $O_2$) is called the oxygen storage capacity (OSC) and the rate at which this happens is embodied in the rate constant, k. It is understood that high OSC and high k, are associated with higher reactivity catalysts.

Oxygen storage capacity was measured using a TA Instruments Q500 thermo-gravimetric analyzer (TGA). A sample of the $CeO_2$ nanoparticles was heated in a muffle furnace under air at 1000° C. for 30 minutes to remove the organic stabilizer, then ground to a uniform consistency to remove any effects from mild sintering. The sample was then heated in the TGA furnace to 700° C. under air and allowed to stay at that temperature for 15 minutes. The sample was exposed to a reducing environment consisting of 5% $H_2$ in nitrogen for 40 min. Then, the sample was exposed to air for 15 min. This was all completed at 700° C. The weight change was recorded by the TA instrument. The calculation used is: (Final weight under Oxygen—Final weight under $H_2/N_2$)/(32× Sample Weight) and the measured values are reported as micromoles $O_2$/g $CeO_2$. For $CeO_{2-\delta}$, consideration of the specific case of $CeO_2$ conversion to $CeO_{1.5}$ (alternatively expressed as $Ce_2O_3$), wherein $Ce^{4+}$ is completely reduced to $Ce^{3+}$, yields a theoretical OSC value of 1454 micromoles $O_2$ per gram. One-sigma confidence interval uncertainties in the measured values are ~10%. The reported rate constants are determined using the additive inverse value of the initial slope of the weight loss curve vs. time and are adjusted for the initial amount of catalyst participating in the reaction. One-sigma confidence intervals for the rate constants are ~12%.

Samples of the materials for the size series of $CeO_2$ nanoparticles were evaluated for OSC and Rate by the procedures described previously. Results are contained in Table 1 below.

TABLE 1

Size Effects

|  | Size (nm) | OSC (µmoles $O_2$/g) | Rate Constant x$10^3$ (min$^{-1}$) |
| --- | --- | --- | --- |
| $CeO_2$ | 1.1 +/− 0.3 | 65 | 0.2 |
| $CeO_2$ | 2.0 +/− 0.5 | 336 | 7.7 |
| $CeO_2$ | 11.8 | 366 | 0.7 |

From the data shown above, it is evident that the beneficial effects of both a large OSC and a high Rate Constant are achieved at around 2 nm. At a size significantly smaller than 2 nm (i.e. 1.1 nm) a large reduction in both the amount and rate of oxygen release is observed. On the other hand, at a size significantly larger than 2 nm (i.e. 11.8 nm) a large reduction in the rate of oxygen release is observed. Thus it can be appreciated for the first time that an improvement in both the OSC and the Rate Constant is afforded for nanoceria at a particle size of about 2 nm.

Figure 3A:
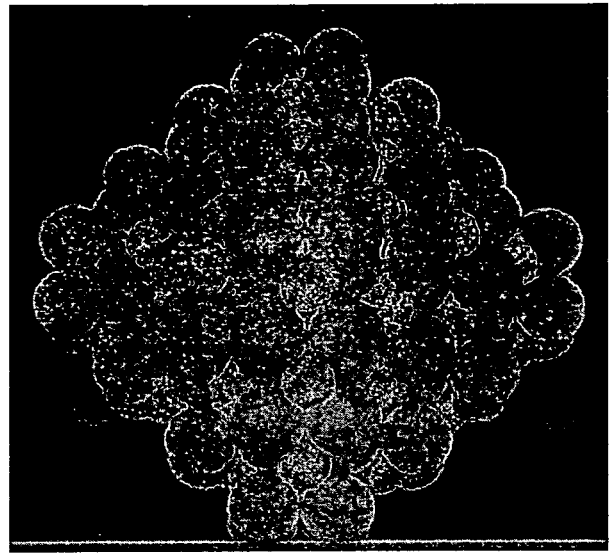
FIGS. 3A and 3B are, respectively, a model of a nominally 2.5 nm diameter $CeO_2$ particle in an idealized octahedral shape with surface terminated oxygen atoms (white balls)
Figure 3B:
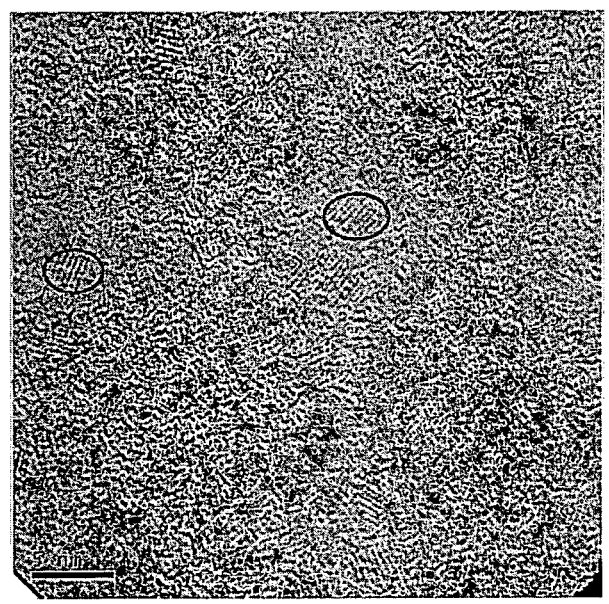

While not wishing to be bound by any particular theory, further insight into this discovery that both the OSC and Rate Constant for $CeO_2$ are enhanced at a size of about 2 nm may be obtained from consideration of FIGS. 3A and 3B. FIG. 3A shows a model of a nominally 2.5 nm diameter $CeO_2$ particle in an idealized octahedral shape consisting of 80 cerium ions (smaller dark balls) and 160 oxygen ions (larger white balls). Examination of model reveals 8 oxygen ions residing on the {111} Miller index crystallographic face of the particle. Forty eight more oxygen ions reside on the edge surfaces denoted by the Miller index {110} while the remaining 24 of the 80 surface oxygen atoms are corner located denoted {100}. Finally, 160−80=80 oxygen ions reside in the interior. Release of just 40 of these labile surface oxygen ions will yield a $Ce_{80}O_{120}$ particle, more conventionally written as $Ce_2O_3$, the chemically reduced form of the catalyst. It is evident that this degree of chemical reduction (complete conversion of $Ce^{4+}$ to $Ce^{3+}$), and possibly more, can be achieved without movement of internal oxygen or cerium ions. In consideration of larger sized particles that possess a reduced surface to volume ratio, a requirement of oxygen ion diffusion from inside the particle will eventually be needed to achieve a similar degree of chemical reduction to $Ce_2O_3$, or beyond, toward an even more fully reduced state. Internal movement of ions would be expected to reduce the rate of chemical reaction. FIG. 3B is a high resolution Field Emission Gun TEM image of stabilized $CeO_2$ particles in the 2-4 nm diameter range. The image readily demonstrates the single-crystalline character of these unagglomerated nanoparticles, confirming that the particles are mainly bounded by the aforementioned Miller index planes. In conclusion, we note that at this size of about 2.5 nm, and only at this size, the numbers of surface and core ions are approximately equal, and one can then meaningfully speak of structured doped nanoparticles possessing two populations of ions disposed entirely in either a core, interior region or in a shell, surface region.

Example 1

Preparation of Cerium Oxide Nanoparticles (Comparative)

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 85° C. with constant stirring. A metal salt solution containing 7.53 grams of cerium (III) nitrate hexahydrate dissolved in 10 grams distilled water (total solution volume of 10-11 ml), was drawn into a syringe pump and then subsequently pumped at a rate of 3 ml/minute into the MAA containing flask. An aliquot of about 10 ml of concentrated (28-30%) ammonium hydroxide was concurrently pumped into the reaction vessel at a rate of 1.5 ml/minute. The actual amount of ammonium hydroxide to be delivered is dependent on the desired pH of the reaction. Ammonium hydroxide was added until a pH of 4.67 was achieved at which time the addition was stopped. A 25 ml aqueous solution containing 2.4 grams of 50 wt. % hydrogen peroxide was then pumped into the reaction flask at a rate of 5 ml/minute via a syringe pump. At the midpoint of the hydrogen peroxide addition, a solution containing 7.53 grams of cerium (III) nitrate hexahydrate dissolved in 10 ml of distilled water (total solution volume 10-11 ml) was added at a rate of 3 ml/minute concurrently with the remaining half of the hydrogen peroxide. When all reagents had been added, the reaction mixture was an opaque dark orange brownish color with a pH of approximately 3.9. The reaction mixture was heated for an additional 60 minutes at 85° C., during which time the pH remained around 3.9. The reaction was cooled with stirring overnight and diafiltered using 500 ml of distilled water to a conductivity of under 10 mS/cm to remove excess water and unreacted materials.

A hydrodynamic diameter of 17.2 nm was measured on an aged dispersion sample many months after preparation, a period of time during which a very low level of particle agglomeration is commonly observed.

Example 2

Preparation of Unstructured Doped Cerium Oxide Nanoparticles: $Ce_{(0.3)}Fe_{(0.7)}O_{2-\delta}$ (Comparative)

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 65° C. with constant stirring. A metal salt solution containing 2.25 grams of cerium (III) nitrate hexahydrate, and 4.99 grams of iron (III) nitrate nonahydrate, 98% $Fe(NO_3)_3 \cdot 9H_2O$, dissolved in 10 grams distilled water (total solution volume of 10-11 ml), was drawn into a syringe pump and then subsequently pumped at a rate of 3 ml/minute into the MAA containing flask. Concurrent with the start of the metal salt solution addition, an aliquot of about 10 ml of concentrated (28-30%) ammonium hydroxide was pumped into the reaction vessel at a rate of 1.5 ml/minute: The actual amount of ammonium hydroxide to be delivered is dependent on the desired pH of the reaction. Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. The reaction mixture turned an opaque dark orange brownish color at around a pH of 5. The reaction mixture was then heated for an additional 60 minutes at 65° C. degrees, during which time the pH dropped to 3.9. The reaction mixture was cooled with stirring overnight and diafiltered to a conductivity of under 10 mS/cm to remove excess water and unreacted materials. The diafiltration process typically required an addition of about 500 ml of distilled water.

A hydrodynamic diameter of 5.8 nm was measured on an aged dispersion sample a few weeks after preparation.

Example 3

Preparation of Structured Doped Cerium Oxide Nanoparticles: $Ce_{(0.6)}Fe_{(0.4)}O_{2-\delta}$ core with an $Fe_{(1.0)}$ $O_{2-\delta}$ shell (Inventive)

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 65° C. with constant stirring. A metal salt solution containing 2.25 grams of cerium (III) nitrate hexahydrate, and 4.99 grams of iron (III) nitrate nonahydrate, 98% $Fe(NO_3)_3 \cdot 9H_2O$, dissolved in 10 grams distilled water (total solution volume of 10-11 ml), was drawn into a syringe pump and then subsequently pumped at a rate of 3 ml/minute into the MAA containing flask. An aliquot of about 10 ml of concentrated (28-30%) ammonium hydroxide was concurrently pumped into the reaction vessel at a rate of 1.5 ml/minute. The actual amount of ammonium hydroxide to be delivered is dependent on the desired pH of the reaction. Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. At the midpoint of the hydrogen peroxide addition, a solution containing 7.13 grams of iron (III) nitrate nonahydrate dissolved in 10 ml of distilled water (total solution volume 10-11 ml) was added at a rate of 3 ml/minute concurrently with the remaining half of the hydrogen peroxide. When all reagents had been added, the reaction mixture was an opaque dark orange brownish color with a pH of approximately 3.9. The reaction mixture was heated for an additional 60 minutes at 65° C., during which time the pH remained around 3.9. The reaction was cooled with stirring overnight and diafiltered using 500 ml of distilled water to a conductivity of under 10 mS/cm to remove excess water and unreacted materials.

A freshly prepared dispersion sample exhibited a clear appearance along with a high degree of laser light scattering, typical of these nanoparticle dispersions.

Samples of the materials prepared as described above in Examples 1-3 were evaluated for OSC and Rate by the procedures described previously. Results are contained in Table 2 below.

TABLE 2

| Ex. | Core Metals (0-50%) | Shell Metals (50-100%) | Bulk % Ce/Zr/Fe | OSC ($\mu moleO_2/g$) | Rate Constant × $10^3$ ($min^{-1}$) | Comment |
|---|---|---|---|---|---|---|
| 1 | Ce | Ce | 100/0/0 | 270.2 | 1.9 | Comparative |
| 2 | Ce(0.3)Fe(0.7) | Ce(0.3)Fe(0.7) | 30/0/70 | 6436.8 | 11.0 | Comparative |
| 3 | Ce(0.6)Fe(0.4) | Fe | 30/0/70 | 6636.6 | 38.4 | Inventive |

Comparison of the results shown above for Example 2-3 to those for Example 1 shows a dramatic increase in both OSC and rate when 70 mole % of iron is introduced. Comparison of the results between Examples 2 and 3, wherein the bulk amounts of cerium and iron metals are matched, shows similar OSC results, but the rate of oxygen release is enhanced by a factor of 3.5× when the iron is structured such that more iron is added during formation of the shell region than during the core region.

Example 4

Preparation of Structured Double Doped Cerium Oxide Nanoparticles with an Undoped Shell: $Ce_{(0.3)}$ $Zr_{(0.3)}Fe_{(0.4)}O_{2-\delta}$ Core with a $Ce_{(1.0)}O_{2-\delta}$ Shell (Comparative)

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 85° C. with constant stirring. A metal salt solution containing 2.25 grams of cerium (III) nitrate hexahydrate, 1.20 grams of zirconyl nitrate hydrate and 2.80 grams of iron (III) nitrate nonahydrate, 98% $Fe(NO_3)_3 \cdot 9H_2O$, dissolved in 10 grams distilled water (total solution volume of 10-11 ml), was drawn into a syringe pump and then subsequently pumped at a rate of 3 ml/minute into the MAA containing flask. An aliquot of about 10 ml of concentrated (28-30%) ammonium hydroxide was concurrently pumped into the reaction vessel at a rate of 1.5 ml/minute. The actual amount of ammonium hydroxide to be delivered is dependent on the desired pH of the reaction. Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. At the midpoint of the hydrogen peroxide addition, a solution containing 7.53 grams of cerium (III) nitrate hexahydrate dissolved in 10 ml of distilled water (total solution volume 10-11 ml) was added at a rate of 3 ml/minute concurrently with the remaining half of the hydrogen peroxide. When all reagents had been added, the reaction mixture was an opaque dark orange brownish color with a pH of approximately 3.95. The reaction mixture was heated for an additional 60 minutes at 65° C., during which time the pH remained around 3.9. The reaction was cooled with stirring overnight and diafiltered using 500 ml of distilled water to a conductivity of under 10 mS/cm to remove excess water and unreacted materials.

A freshly prepared dispersion sample exhibited a clear appearance along with a high degree of laser light scattering, typical of these nanoparticle dispersions.

Example 5

Preparation of Structured Double Doped Cerium Oxide Nanoparticles: $Ce_{(0.3)}Zr_{(0.3)}Fe_{(0.4)}O_{2-\delta}$ Core with a $Ce_{(0.6)}Fe_{(0.4)}O_{2-\delta}$ Shell (Inventive)

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 85° C. with constant stirring. A metal salt solution containing 5.27 grams of cerium (III) nitrate hexahydrate and 1.20 grams of zirconyl nitrate hydrate, dissolved in 10 grams distilled water (total solution volume of 10-11 ml), was drawn into a syringe pump and then subsequently pumped at a rate of 3 ml/minute into the MAA containing flask. An aliquot of about 10 ml of concentrated (28-30%) ammonium hydroxide was concurrently pumped into the reaction vessel at a rate of 1.5 ml/minute. The actual amount of ammonium hydroxide to be delivered is dependent on the desired pH of the reaction. Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. At the midpoint of the hydrogen peroxide addition, a solution containing 4.52 grams of cerium (III) nitrate hexahydrate and 2.80 grams of iron (III) nitrate nonahydrate, 98% $Fe(NO_3)_3.9H_2O$, dissolved in 10 ml of distilled water (total solution volume 10-11 ml) was added at a rate of 3 ml/minute concurrently with the remaining half of the hydrogen peroxide. When all reagents had been added, the reaction mixture was an opaque dark orange brownish color with a pH of approximately 3.79. The reaction mixture was heated for an additional 60 minutes at 65 degrees, during which time the pH remained around 3.8. The reaction was cooled with stirring overnight and diafiltered using 500 ml of distilled water to a conductivity of under 10 mS/cm to remove excess water and unreacted materials.

A freshly prepared dispersion sample exhibited a clear appearance along with a high degree of laser light scattering, typical of these nanoparticle dispersions.

Samples of the materials prepared as described above in Examples 1, 4, and 5 were evaluated for OSC and Rate by the procedures described previously. Results are contained in Table 3 below.

Comparison of the results shown above for Examples 4-5 to those for Example 1 shows a dramatic increase in both OSC and rate when 15 mole % of zirconium and 20 mole % of iron are introduced. Comparison of the results between Examples 4 and 5, wherein the bulk amounts of cerium, zirconium and iron metals are matched, shows similar OSC results, but the rate of oxygen release is enhanced by a factor of 1.8× when the iron is structured such that more iron is added during formation of the shell region than during the core region.

Example 6

Preparation of Unstructured Double Doped Cerium Oxide Nanoparticles $Ce_{(0.45)}Zr_{(0.15)}Fe_{(0.4)}O_{2-\delta}$ (Comparative)

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 85° C. with constant stirring. A metal salt solution containing 3.39 grams of cerium (III) nitrate hexahydrate, 0.60 grams of zirconyl nitrate hydrate and 2.80 grams of iron (III) nitrate nonahydrate, 98% $Fe(NO_3)_3.9H_2O$, dissolved in 10 grams distilled water (total solution volume of 10-11 ml), was drawn into a syringe pump and then subsequently pumped at a rate of 3 mL/minute into the MAA containing flask. An aliquot of about 10 ml of concentrated (28-30%) ammonium hydroxide was concurrently pumped into the reaction vessel at a rate of 1.5 mL/minute. The actual amount of ammonium hydroxide to be delivered is dependent on the desired pH of the reaction. Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. After completion of the hydrogen peroxide addition, a solution containing 3.39 grams of cerium (III) nitrate hexahydrate, 0.60 grams of zirconyl nitrate hydrate and 2.80 grams of iron (III) nitrate nonahydrate, 98% $Fe(NO_3)_3.9H_2O$, dissolved in 10 ml of distilled water (total solution volume 10-11 ml) was added at a rate of 3 ml/minute. When all reagents had been added, the reaction mixture was an opaque dark orange brownish color with a pH of approximately 3.83. The reaction mixture was heated for an additional 60 minutes at 85° C., during which time the pH remained around 3.9. The reaction was cooled with stirring overnight and diafiltered using 500 ml of distilled water to a conductivity of under 10 mS/cm to remove excess water and unreacted materials.

A hydrodynamic diameter of 13.8 nm was measured on an aged dispersion sample several months after preparation, a period of time during which a very low level of particle agglomeration is commonly observed.

TABLE 3

| Ex. | Core Metals (0-50%) | Shell Metals (50-100%) | Bulk % Ce/Zr/Fe | OSC ($\mu mole O_2/g$) | Rate Constant × $10^3$ ($min^{-1}$) | Comment |
|---|---|---|---|---|---|---|
| 1 | Ce | Ce | 100/0/0 | 270.2 | 1.9 | Comparative |
| 4 | Ce(0.3)Zr(0.3)Fe(.4) | Ce | 65/15/20 | 2796.7 | 10.8 | Comparative |
| 5 | Ce(0.7)Zr(0.3) | Ce(0.6)Fe(0.4) | 65/15/20 | 2648.1 | 19.9 | Inventive |

Example 7

Preparation of Structured Double Doped Cerium Oxide Nanoparticles: $Ce_{(0.6)}Fe_{(0.4)}O_{2-\delta}$ Core with a $Ce_{(0.3)}Zr_{(0.3)}Fe_{(0.4)}O_{2-\delta}$ Shell (Inventive)

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 85° C. with constant stirring. A metal salt solution containing 2.26 grams of cerium (III) nitrate hexahydrate, 1.20 grams of zirconyl nitrate hydrate and 2.80 grams of iron (III) nitrate nonahydrate, 98% $Fe(NO_3)_3 \cdot 9H_2O$, dissolved in 10 grams distilled water (total solution volume of 10-11 ml), was drawn into a syringe pump and then subsequently pumped at a rate of 3 ml/minute into the MAA containing flask. An aliquot of about 10 ml of concentrated (28-30%) ammonium hydroxide was concurrently pumped into the reaction vessel at a rate of 1.5 ml/minute. The actual amount of ammonium hydroxide to be delivered is dependent on the desired pH of the reaction. Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. After completion of the hydrogen peroxide addition, a solution containing 4.52 grams of cerium (III) nitrate hexahydrate and 2.80 grams of iron (III) nitrate nonahydrate, 98% $Fe(NO_3)_3 \cdot 9H_2O$, dissolved in 10 ml of distilled water (total solution volume 10-11 ml) was added at a rate of 3 ml/minute. When all reagents had been added, the reaction mixture was an opaque dark orange brownish color with a pH of approximately 3.83. The reaction mixture was heated for an additional 60 minutes at 85° C., during which time the pH remained around 3.8. The reaction was cooled with stirring overnight and diafiltered using 500 ml of distilled water to a conductivity of under 10 mS/cm to remove excess water and unreacted materials.

A freshly prepared dispersion sample exhibited a clear appearance along with a high degree of laser light scattering, typical of these nanoparticle dispersions.

Example 8

Preparation of Structured Double Doped Cerium Oxide Nanoparticles: $Ce_{(0.3)}Zr_{(0.3)}Fe_{(0.4)}O_{2-\delta}$ Core with a $Ce_{(0.6)}Fe_{(0.4)}O_{2-\delta}$ Shell (Inventive)

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 85° C. with constant stirring. A metal salt solution containing 2.26 grams of cerium (III) nitrate hexahydrate, 1.20 grams of zirconyl nitrate hydrate and 2.80 grams of iron (III) nitrate nonahydrate, 98% $Fe(NO_3)_3 \cdot 9H_2O$, dissolved in 10 grams distilled water (total solution volume of 10-11 ml), was drawn into a syringe pump and then subsequently pumped at a rate of 3 ml/minute into the MAA containing flask. An aliquot of about 10 ml of concentrated (28-30%) ammonium hydroxide was concurrently pumped into the reaction vessel at a rate of 1.5 ml/minute. The actual amount of ammonium hydroxide to be delivered is dependent on the desired pH of the reaction. Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. After completion of the hydrogen peroxide addition, a solution containing 4.52 grams of cerium (III) nitrate hexahydrate and 2.80 grams of iron (III) nitrate nonahydrate, 98% $Fe(NO_3)_3 \cdot 9H_2O$, dissolved in 10 ml of distilled water (total solution volume 10-11 ml) was added at a rate of 3 ml/minute. When all reagents had been added, the reaction mixture was an opaque dark orange brownish color with a pH of approximately 3.83. The reaction mixture was heated for an additional 60 minutes at 85° C., during which time the pH remained around 3.8. The reaction was cooled with stirring overnight and diafiltered using 500 ml of distilled water to a conductivity of under 10 mS/cm to remove excess water and unreacted materials.

A freshly prepared dispersion sample exhibited a clear appearance along with a high degree of laser light scattering, typical of these nanoparticle dispersions.

Samples of the materials prepared as described above in Examples 6-8 were evaluated for OSC and Rate by the procedures described previously. Results are contained in Table 4 below.

TABLE 4

| Ex. | Core Metals (0-50%) (Method 2) | Shell Metals (50-100%) (Method 2) | Bulk % Ce/Zr/Fe | OSC ($\mu mole O_2/g$) | Rate Constant × $10^3$ ($min^{-1}$) | Comment |
| --- | --- | --- | --- | --- | --- | --- |
| 6 | Ce(0.45)Zr(0.15)Fe(0.4) | Ce(0.45)Zr(0.15)Fe(0.4) | 45/15/40 | 4361.8 | 7.2 | Comparative |
| 7 | Ce(0.6)Fe(0.4) | Ce(0.3)Zr(0.3)Fe(0.4) | 45/15/40 | 4562.3 | 12.7 | Inventive |
| 8 | Ce(0.3)Zr(0.3)Fe(0.4) | Ce(0.6)Fe(0.4) | 45/15/40 | 4268.3 | 12.7 | Inventive |

Comparison of the results shown above for Examples 6-8, wherein the bulk amounts of cerium, zirconium and iron metals are matched, shows similar OSC results, however the rate of oxygen release is enhanced by a factor of about 1.8× when the zirconium is structured such that it is added completely during formation of only the shell region (Example 7), or completely during formation of only the core region (Example 8).

Example 9

Preparation of Unstructured Double Doped Cerium Oxide Nanoparticles: $Ce_{(0.45)}Zr_{(0.15)}Fe_{(0.4)}O_{2-\delta}$ (Comparative)

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 85° C. with constant stirring. A metal salt solution containing 3.39 grams of cerium (III) nitrate hexahydrate, 0.60 grams of zirconyl nitrate hydrate and 2.80 grams of iron (III) nitrate nonahydrate, 98% Fe(NO$_3$)$_3$.9H$_2$O, dissolved in 10 grams distilled water (total solution volume of 10-11 ml), was drawn into a syringe pump and then subsequently pumped at a rate of 3 ml/minute into the MAA containing flask. An aliquot of about 10 ml of concentrated (28-30%) ammonium hydroxide was concurrently pumped into the reaction vessel at a rate of 1.5 ml/minute. The actual amount of ammonium hydroxide to be delivered is dependent on the desired pH of the reaction Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. At the midpoint of the hydrogen peroxide addition, a solution containing 3.39 grams of cerium (III) nitrate hexahydrate, 0.60 grams of zirconyl nitrate hydrate and 2.80 grams of iron (III) nitrate nonahydrate, 98% Fe(NO$_3$)$_3$.9H$_2$O, dissolved in 10 ml of distilled water (total solution volume 10-11 ml) was added at a rate of 3 ml/minute. When all reagents had been added, the reaction mixture was an opaque dark orange brownish color with a pH of approximately 3.83. The reaction mixture was heated for an additional 60 minutes at 85° C., during which time the pH remained around 3.9. The reaction was cooled with stirring overnight and diafiltered using 500 ml of distilled water to a conductivity of under 10 mS/cm to remove excess water and unreacted materials.

A hydrodynamic diameter of 24.9 nm was measured on an aged dispersion sample many months after preparation, a period of time during which a low level of particle agglomeration is commonly observed.

Example 10

Preparation of Structured Double Doped Cerium Oxide Nanoparticles: Ce$_{(0.6)}$Fe$_{(0.4)}$O$_{2-\delta}$ Core with a Ce$_{(0.3)}$Zr$_{(0.3)}$Fe$_{(0.4)}$O$_{2-\delta}$ Shell (Inventive)

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 85° C. with constant stirring. A metal salt solution containing 2.26 grams of cerium (III) nitrate hexahydrate, 1.20 grams of zirconyl nitrate hydrate and 2.80 grams of iron (III) nitrate nonahydrate, 98% Fe(NO$_3$)$_3$.9H$_2$O, dissolved in 10 grams distilled water (total solution volume of 10-11 ml), was drawn into a syringe pump and then subsequently pumped at a rate of 3 ml/minute into the MAA containing flask. An aliquot of about 10 ml of concentrated (28-30%) ammonium hydroxide was concurrently pumped into the reaction vessel at a rate of 1.5 ml/minute. The actual amount of ammonium hydroxide to be delivered is dependent on the desired pH of the reaction. Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. At the midpoint of the hydrogen peroxide addition, a solution containing 4.52 grams of cerium (III) nitrate hexahydrate and 2.80 grams of iron (III) nitrate nonahydrate, 98% Fe(NO$_3$)$_3$.9H$_2$O, dissolved in 10 ml of distilled water (total solution volume 10-11 ml) was added at a rate of 3 ml/minute. When all reagents had been added, the reaction mixture was an opaque dark orange brownish color with a pH of approximately 3.83. The reaction mixture was heated for an additional 60 minutes at 85° C., during which time the pH remained around 3.8. The reaction was cooled with stirring overnight and diafiltered using 500 ml of distilled water to a conductivity of under 10 mS/cm to remove excess water and unreacted materials.

A freshly prepared dispersion sample exhibited a clear appearance along with a high degree of laser light scattering, typical of these nanoparticle dispersions.

Example 11

Preparation of Structured Double Doped Cerium Oxide Nanoparticles: Ce$_{(0.3)}$Zr$_{(0.3)}$Fe$_{(0.4)}$O$_{2-\delta}$ Core with a Ce$_{(0.6)}$Fe$_{(0.4)}$O$_{2-\delta}$ Shell (Inventive)

To a 600 ml Erlenmeyer flask containing a one inch magnetic stir bar, 8.13 grams of (98%) methoxyacetic acid (MAA) and 130 ml of distilled water were introduced. The flask was then placed into a water bath at a temperature of about 85° C. with constant stirring. A metal salt solution containing 2.26 grams of cerium (III) nitrate hexahydrate, 1.20 grams of zirconyl nitrate hydrate and 2.80 grams of iron (III) nitrate nonahydrate, 98% Fe(NO$_3$)$_3$.9H$_2$O, dissolved in 10 grams distilled water (total solution volume of 10-11 ml), was drawn into a syringe pump and then subsequently pumped at a rate of 3 ml/minute into the MAA containing flask. An aliquot of about 10 ml of concentrated (28-30%) ammonium hydroxide was concurrently pumped into the reaction vessel at a rate of 1.5 ml/minute. The actual amount of ammonium hydroxide to be delivered is dependent on the desired pH of the reaction. Ammonium hydroxide was added until a pH of 4.5 was achieved at which time the addition was stopped. A 25 ml aqueous solution containing 2.4 grams of 50 wt. % hydrogen peroxide was then pumped into the reaction flask at a rate of 5 ml/minute via a syringe pump. At the midpoint of the hydrogen peroxide addition, a solution containing 4.52 grams of cerium (III) nitrate hexahydrate and 2.80 grams of iron (III) nitrate nonahydrate, 98% Fe(NO$_3$)$_3$.9H$_2$O, dissolved in 10 ml of distilled water (total solution volume 10-11 ml) was added at a rate of 3 ml/minute. When all reagents had been added, the reaction mixture was an opaque dark orange brownish color with a pH of approximately 3.83. The reaction mixture was heated for an additional 60 minutes at 85° C., during which time the pH remained around 3.8. The reaction was cooled with stirring overnight and diafiltered using 500 ml of distilled water to a conductivity of under 10 mS/cm to remove excess water and unreacted materials.

A freshly prepared dispersion sample exhibited a clear appearance along with a high degree of laser light scattering, typical of these nanoparticle dispersions.

Samples of the materials prepared as described above in Examples 9-11 were evaluated for OSC and Rate by the procedures described previously. Results are contained in Table 5 below.

TABLE 5

| Ex. | Core Metals (0-50%) (Method 3) | Shell Metals (50-100%) (Method 3) | Bulk % Ce/Zr/Fe | OSC ($\mu$moleO$_2$/g) | Rate Constant × $10^3$ (min$^{-1}$) | Comment |
|---|---|---|---|---|---|---|
| 9 | Ce(0.45)Zr(0.15)Fe(0.4) | Ce(0.45)Zr(0.15)Fe(0.4) | 45/15/40 | 4237.9 | 7.8 | Comparative |
| 10 | Ce(0.6)Fe(0.4) | Ce(0.3)Zr(0.3)Fe(0.4) | 45/15/40 | 4436.7 | 12.1 | Inventive |
| 11 | Ce(0.3)Zr(0.3)Fe(0.4) | Ce(0.6)Fe(0.4) | 45/15/40 | 4169.6 | 13.9 | Inventive |

Comparison of the results shown above for Examples 9-11, wherein the bulk amounts of cerium, zirconium and iron metals are matched, shows similar OSC results, however the rate of oxygen release is enhanced by a factor of 1.6-1.8× when the zirconium is structured such that it is added completely during formation of only the shell region (Example 10), or completely during formation of only the core region (Example 11).

Example 12

Preparation of Unstructured Doped Cerium Oxide Nanoparticles: $Ce_{(0.1)}Fe_{(0.9)}O_{2-\delta}$ (Comparative)

The procedures of Example 2 were repeated except that the molar amounts of cerium and iron were adjusted such that a molar ratio of Ce to Fe of 1 to 9 was employed. Analysis of the resulting nanoparticulate material by TEM determined a grain size of 2.8+/−0.9 nm.
By comparison, a hydrodynamic diameter of 14.9 nm was measured on an aged dispersion sample several months after preparation, consistent with a very low level of particle agglomeration commonly seen over this time span.

Example 13

Preparation of Structured Doped Cerium Oxide Nanoparticles: $Ce_{(0.1)}Fe_{(0.9)}O_{2-\delta}$ (Inventive)

The procedures of Example 3 were repeated except that the molar amounts of cerium and iron were adjusted such that a molar ratio of Ce to Fe of 1 to 4 was employed during formation of the core region. Analysis of the resulting nanoparticulate material by TEM determined a grain size of 2.3+/−0.8 nm. By comparison, a hydrodynamic diameter of 12.1 nm was measured on an aged dispersion sample several months after preparation, once again consistent with a very low level of particle agglomeration commonly seen over this time span.

Samples of the materials prepared as described above in Examples 1, 12, and 13 were evaluated for OSC and rate by the procedures described previously. Results are contained in Table 6 below.

TABLE 6

| Ex. | Core Metals (0-50%) | Shell Metals (50-100%) | Bulk Ce/Fe Composition | OSC ($\mu$mole/g) | Rate Constant × $10^3$ (min$^{-1}$) | Comment |
|---|---|---|---|---|---|---|
| 1 | Ce | Ce | 100/0 | 270.2 | 1.9 | Comparative |
| 12 | Ce(0.1)Fe(0.9) | Ce(0.1)Fe(0.9) | 10/90 | 7998.99 | 20.4 | Comparative |
| 13 | Ce(0.2)Fe(0.8) | Fe | 10/90 | 7960.11 | 32.0 | Inventive |

Comparison of the results above for Examples 12-13 to those for Example 1 shows a dramatic increase in both OSC and rate when 90% of the cerium is replaced by iron. Comparison of the results for Examples 12 and 13, wherein the bulk amount of cerium and iron metal are matched, shows similar OSC results, but the rate of oxygen release is enhanced by a factor of 1.6× when the iron is structured such that more iron is added during formation of the shell region than during the core region.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed:

1. A method of making a structured, doped, cerium oxide nanoparticle, comprising:
    a. forming a first reaction mixture comprising cerium(III), an optional metal ion other than cerium, a base, a stabilizer, and a solvent;
    b. contacting said first reaction mixture with an oxidant;
    c. forming a cerium oxide nanoparticle core by heating the product of step b);
    d. forming a second reaction mixture by combining with the first reaction mixture one or more metal ions other than cerium, and an optional additional quantity of cerium(III); and
    e. forming a shell partially or continuously surrounding said core of cerium oxide by heating said second reaction mixture to produce a product dispersion of structured cerium oxide nanoparticles.

2. The method of claim 1, wherein the first reaction mixture further comprises one or more metal ions other than cerium; and wherein the identity and/or relative quantity of metal ions differs from that of the second reaction mixture.

3. The method of claim 1, wherein step d) further comprises addition of cerium (III) ions and oxidant.

4. The method of claim 1, wherein the heating of step c) or step e) raises the reaction mixture to about 50° C. to 100° C.

5. The method of claim 1, wherein the addition of metal ions in step d) is performed concurrently with the addition of the oxidant in step b).

6. The method of claim 5, wherein the introduction of the metal ions commences at about the midpoint of the introduction of the oxidant.

7. The method claim 1, further comprising a step of diluting or concentrating the product dispersion of step e).

8. The method claim 1, further comprising a step of diafiltration of the product dispersion to less than 10 mSiemens.

9. The method claim 7, further comprising a step of diafiltration of the product dispersion to less than 10 mSiemens.

10. The method claim 1, wherein the stabilizer is an alkoxylated carboxylic acid.

11. The method of claim 10, wherein the alkoxylated carboxylic acid is methoxyacetic acid.

12. The method of claim 1, wherein the base is ammonium hydroxide.

13. The method of claim 1, wherein the oxidant is air, molecular oxygen or hydrogen peroxide.

14. The method of claim 1, wherein the metal ion other than cerium are selected from the group consisting of ions of: Li, Mg, Sc, Ti, V, Cr, Zr, Mn, Fe, Co, Ni, Cu, Ag, Au, Bi, Pd, Pt, Pr, Gd, Sm, Y, La, and combinations thereof.

15. The method of claim 1, wherein the metal ion other than cerium is an ion of a transition metal.

16. The method of claim 1, wherein the amount of metal ion other than cerium in steps a) and d) are equal.

17. The method of claim 15, wherein the metal ion other than cerium is an ion of iron, zirconium, or a combination thereof.

18. The method of claim 17, wherein the metal ion other than cerium is iron; and the quantity of iron ion added in step d) is greater than that added in step a).

19. The method of claim 17, wherein the metal ion other than cerium added in step d) consists essentially of iron ion.

20. The method of claim 17, wherein zirconium ion is the metal ion other than cerium, and the amount added in step d) is greater than that in step a).

21. The method of claim 17, wherein zirconium ion is the metal ion other than cerium, and the amount added in step d) is less than that in step a).

* * * * *